United States Patent [19]

Perisic

[11] 4,318,605

[45] Mar. 9, 1982

[54] STAND FOR PHOTOGRAPHIC APPARATUS

[76] Inventor: Zoran Perisic, "Gwynfenton", Whitewell, St. Teath, Cornwall, England

[21] Appl. No.: 177,232

[22] Filed: Aug. 11, 1980

[30] Foreign Application Priority Data

Aug. 13, 1979 [GB] United Kingdom ............... 28150/79

[51] Int. Cl.$^3$ .......................... G03B 17/00; A63J 5/00
[52] U.S. Cl. ....................................... 354/293; 352/89
[58] Field of Search ................. 358/93; 354/293, 110; 352/89

[56] References Cited

U.S. PATENT DOCUMENTS

| | | | |
|---|---|---|---|
| 2,713,609 | 7/1955 | Niklason | 354/293 X |
| 2,715,534 | 8/1955 | Hoge et al. | 354/293 X |
| 2,727,427 | 12/1955 | Jenkins | 352/89 |
| 3,322,487 | 5/1967 | Renner | 352/89 |
| 4,018,519 | 4/1977 | Clapp | 354/110 X |
| 4,100,572 | 7/1978 | Perisic | 358/93 |
| 4,249,817 | 2/1981 | Blau | 354/293 |

FOREIGN PATENT DOCUMENTS 994817 8/1951 France ................................ 354/293
548564 4/1941 United Kingdom .

*Primary Examiner*—Donald A. Griffin
*Attorney, Agent, or Firm*—Schwartz, Jeffery, Schwaab, Mack, Blumenthal & Koch

[57] ABSTRACT

A stand for photographic apparatus for use in filming has a main frame rotatable about a first verticle axis, and a circular support mounted on the frame for rotation about a second horizontal, diametric axis. The circular support includes an inner and an outer ring, one ring being rotatable relative to the other about a third axis through the center of the circular support: the three axes being perpendicular to one another. The circular support carries, a camera mounting on one side arranged so that a camera will be positioned with its lens axis along the third axis, and a projector mounting on the other side of the circular support arranged so that a projector's projection axis is positioned perpendicular to the lens axis.

11 Claims, 7 Drawing Figures

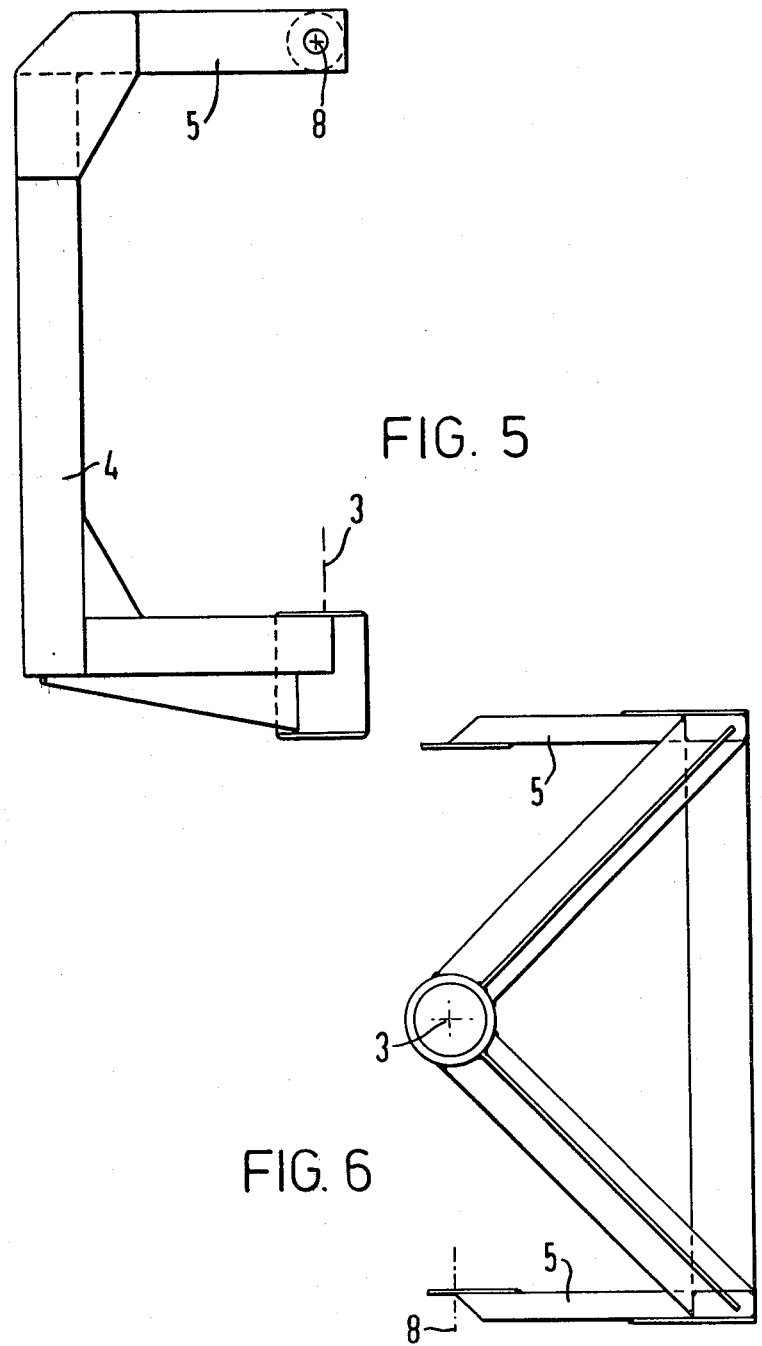

STAND FOR PHOTOGRAPHIC APPARATUS

FIELD OF THE INVENTION

This invention relates to an improved stand for photographic apparatus of use in filming.

BRIEF DISCUSSION OF THE PRIOR ART

Although the stand of the present invention may be used for any suitable filming process, the stand has been particularly designed for supporting a camera and projector for use in the method disclosed in my prior U.S. Pat. No. 4,100,572 and for clarity the present invention will be described with reference to that method.

In that application I have described and claimed a method of providing apparent relative movement in depth between a subject and a background comprising projecting the background onto a reflective surface, placing a subject to which movement is to be imparted in the optical path between the background and a camera, and synchronising the size of picture seen by the camera with size conditions imparted to the background. During an actual or apparent increase or decrease in size of the imparted background the camera lens is synchronised to make a corresponding adjustment so that no apparent alteration in the background is seen by the camera lens whereas the subject, which is only affected by the adjustment of the camera, appears to move relative in depth to the background.

This method is also fully discussed in my article "ZOPTIC" Special Effects which appeared in the July 1977 issue of THE BKSTS JOURNAL. The preferred arrangement is disclosed in figure 1 of that article in which the camera and projector have synchronised zoom lenses in a front projection arrangement. In such an arrangement, in order to enhance the realism, synchronised panning and tilting is also provided and because, the projection is front projection the camera and projector are mounted on the same stand—see for example the stand shown on page 235 of my above noted article. However, previous arrangements of stands, although providing axes of rotation for the movements to be carried out, have proved generally unsatisfactory for the operator and moreover slightly inaccurate since it has always been necessary to space the axes from one another in order to accommodate the movement.

SUMMARY OF THE PRESENT INVENTION

An object of the present invention therefore is to provide an improved stand.

According to the present invention an improved stand for photographic apparatus for use in filming comprises means for supporting the photographic apparatus for movement about three transverse axes, the axes intersecting one another substantially at a common point. Preferably the axes are orthogonal to one another.

Preferably the means for supporting the photographic apparatus comprises a support mounted on a main frame rotatable about a first vertical axis, the support being mounted on the frame for rotation about a second horizontal axis, and part of the support being rotatable relative to its mountings about a third axis.

The support may be a circular support mounted in bearings between spaced arms of the main frame, the first axis containing the center of the circle, the second axis being diametric and containing the center of the circle, and the third axis being through the center of the circle, an inner ring of the support being rotatable relative to an outer ring.

In a preferred form a stand for photographic apparatus comprises a main frame rotatable about a first vertical axis and having two spaced arms, a circular support journalled between the two spaced arms for rotation about a second diametric axis intersected by the first axis at the center of the circular support, the circular support including an inner ring and an outer ring, the inner ring being rotatable relative to the outer ring about a third axis passing through the center of the circular support, a camera mounted on one side of the circular support and directed through the opening defined by the circular support so that the lens axis lies substantially along the third axis, a projector mounted on the other side of the circular support having a projection axis perpendicular to the lens axis, and a semi-silvered mirror mounted at 45° to both the lens axis and the projection axis, the projector and camera being disposed on opposite sides of vertical plane containing the second axis and the circular support so as to counterbalance each other about said second axis.

Preferably the camera and projector include zoom lenses which are interlocked either electronically or mechanically with identical focal length matching so that their focal lengths can be changed in unison.

In the preferred arrangement the movement of the circular support about said three axes is effected by respective motors which may be computer controlled.

The present invention provides complete mobility of movement. The stand or support for photographic apparatus providing for movement to the left and right, up and down and rotation, and the special effects disclosed in my copending application providing movement in depth. Thus a subject can be made to appear to move in any direction whilst in fact the subject is perfectly static. If desired, of course, the subject may move as well.

In a preferred arrangement the support is mounted from above and is movable relative to the subject. Therefore according to another aspect of the invention there is provided a photographic system comprising a support for photographic apparatus arranged for movement about three orthogonal axes, the axes intersecting one another substantially at a common point, a camera carried by the support and having a lens axis co-linear with one of said three axes, a projector carried by the support and having a projection axis substantially perpendicular to the lens axis, and a semi-silvered mirror mounted at 45° to both the lens axis and the projection axis, the support being mounted on a carriage arranged for movement in a single plane in two directions perpendicular to one another.

Preferably the support is suspended from the carriage by a telscopic boom so that the support is movable in a direction perpendicular to the said single plane.

BRIEF DESCRIPTION OF THE DRAWINGS

The invention will now be described by way of example with reference to the accompanying diagrammatic drawings in which:

FIG. 5 is a side view of the main frame;
FIG. 6 is a plan view of the main frame in FIG. 5.

Figure 1:
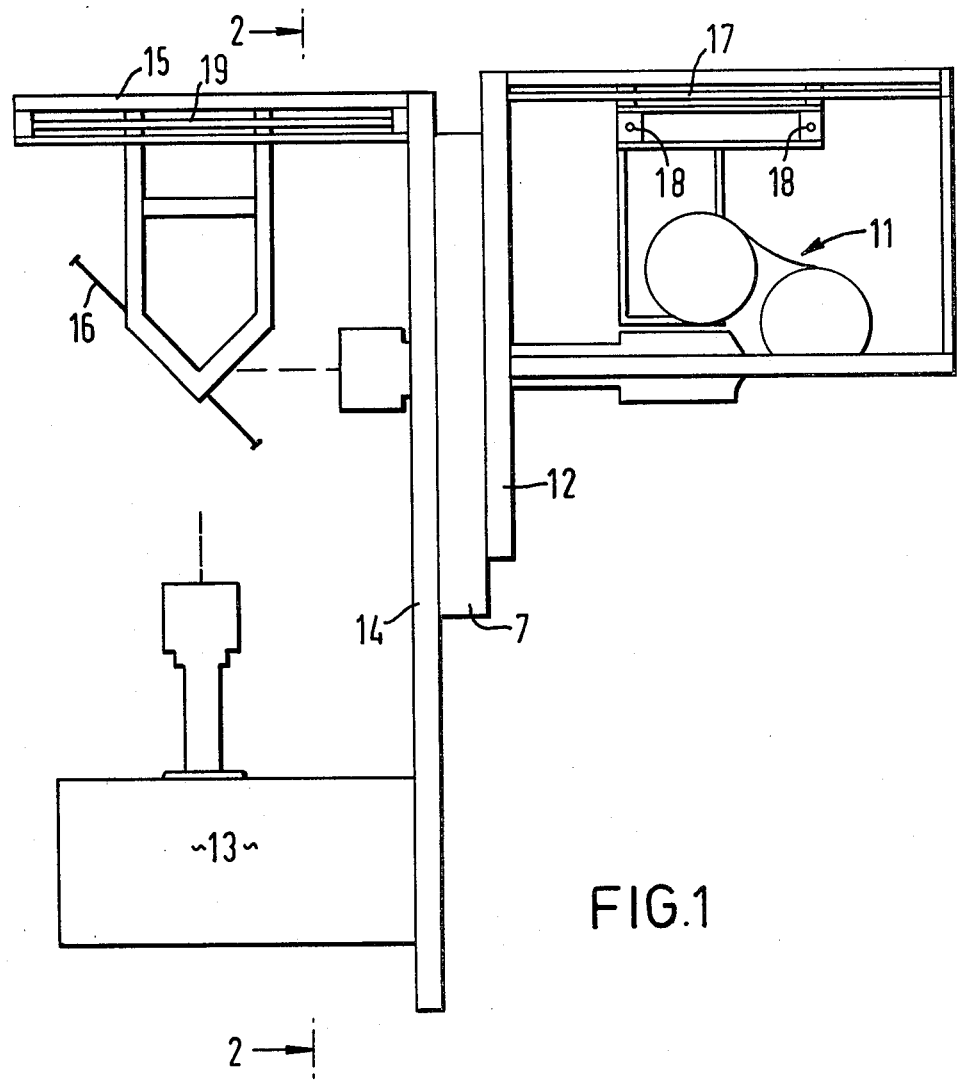
FIG. 1 is a side view of the preferred embodiment but with the main frame omitted for clarity.
Figure 3:
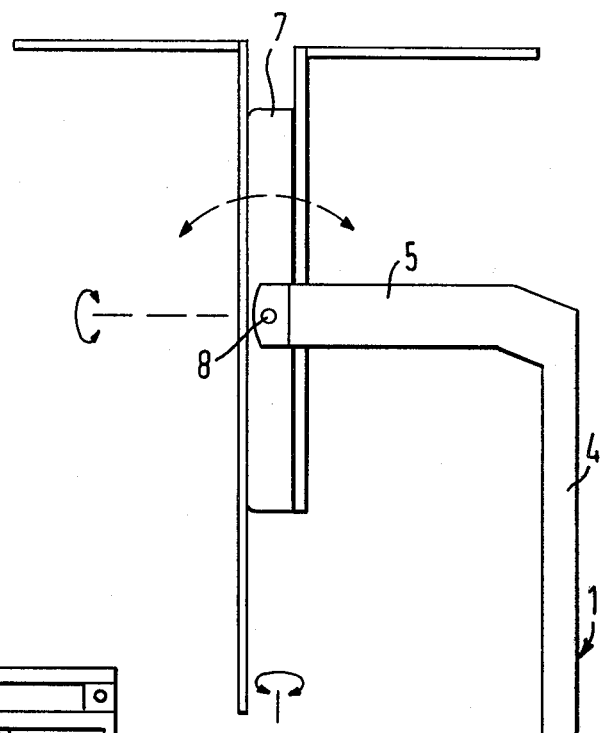
FIG. 3 is a side view of the main frame showing the three orthogonal axes.

In the drawings a stand, primarily for a camera and projector photographic assembly, has a main frame 1 with a bearing cup 2 mounted for rotation about a first vertical axis 3. The main frame 1 may be supported for rotation in suitable bearings on the ground as shown in FIG. 2 or may be supported from above.

The main frame 1 has two upstanding side members 4 and arms 5 one of which extends from the upper free end of each of side members 4. Journalled between the arms 5 in suitable bearings 6 is a circular support 7. Thus, as seen particularly from FIG. 2, the circular support 7 is movable about on a second axis 8 which contains a diameter of the circular support. By comparison of FIGS. 2 and 6 it will be understood that the first and second axes 3 and 8 are orthogonal and intersect one another at the center 9 of the circular support. The third axis of movement contains the center 9 and is formed by rotation on inner ring 10 of the circular support 7.

Referring now particularly to FIG. 1 the circular support 7 has a camera 11 and its mounting 12 secured to one side thereof and a projector 13 and its mounting 14 secured to the other side. The projector mounting 14 also carries a mounting 15 for a semi-silvered mirror 16 set at 45° and arranged to direct the projected background image directly along the lens axis of the camera 11. The camera 11 is mounted upside-down so that the bulk of its weight lies above the second axis 8 compensating and counterbalancing the weight of the projector 13 which lies below and on the opposite side of the axis 8. The camera mounting 12 includes two perpendicular pairs of parallel rails 17 and 18 which enable fine adjustments of the position of the camera to be made manually as desired by the operator. The lens axis of the camera preferably lies along the third axis of movement 9.

Figure 2:
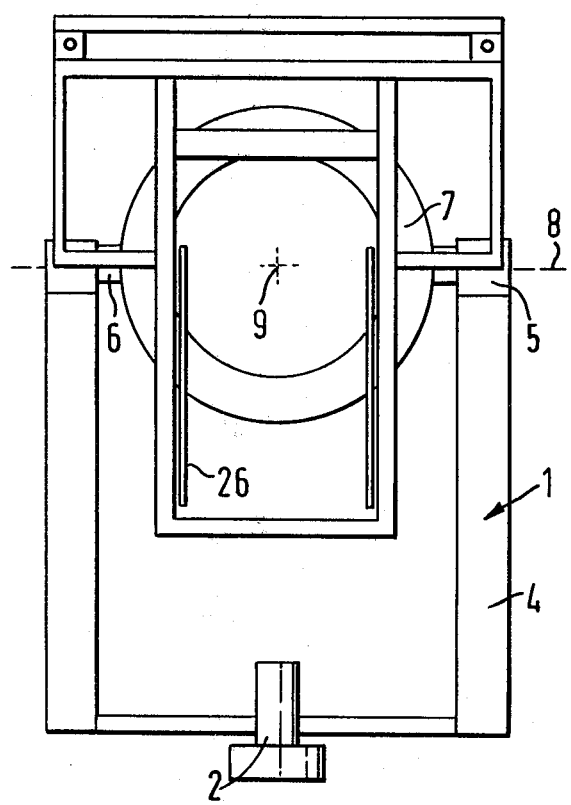
FIG. 2 is a view on 2—2 of FIG. 1 but with the main frame included and the camera and its mounting omitted.

The projector 13 is movable for slight adjustment, up and down as seen in FIG. 1, on parallel rails 26, as is best seen in FIG. 2 if the nodal point of the lenses is non coincidental, and the mirror 16 is movable to the left and right by means of a pair of parallel rails 19. The adjustment of the mirror is to counter the efect of shadows, since in a front projection arrangement the subject casts a shadow on the screen and if the optical system is misaligned the shadow appears in the form of dark fringes about the subject. The adjustment of the position of the mirror has the same effect as raising the camera up and down and enables top and bottom shadows to be avoided, while the adjustment of the camera slide enables side shadows to be avoided.

Figure 4:
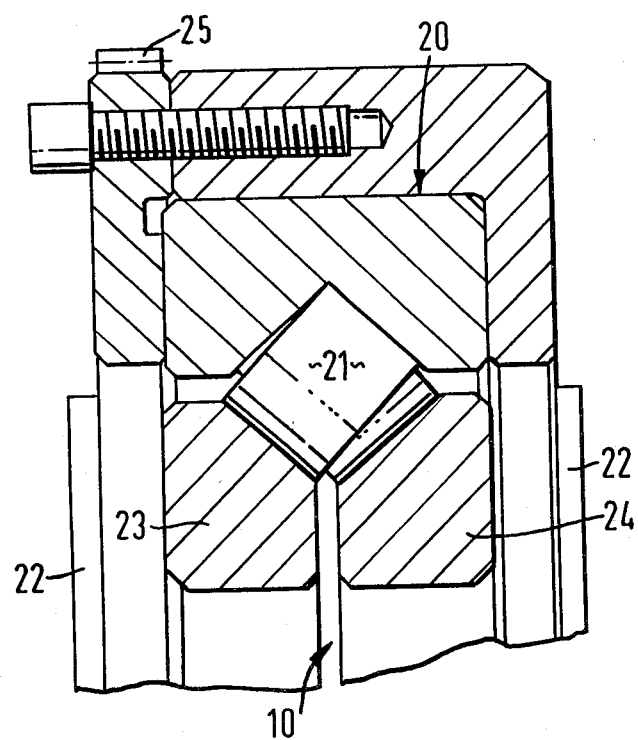
FIG. 4 is a section through the circular support.

The circular support 7 has an inner ring 10 and an outer ring 20 (see FIG. 4). The inner ring 10 is rotatable within the outer ring 20 on tapered roller bearings 21 and has circular plates 22 on each side to which the respective camera and projector mounting are secured. The inner ring 10, as shown, has two ring halves 23 and 24 secured together but if desired the inner ring may be a single ring. In order to effect relative movement of the inner ring 10 with respect to the outer ring 20 a motor (not shown) is attached to the inner ring and is provided with gearing which engages an angular toothed ring 25 on the outer ring 20.

The movement of the circular support about the axes 3 and 8 is also preferably motor drive by suitable motors, not shown. Preferably the movements can be programmed into a computer and then computer controlled after the computer has been programmed for a particular desired movement. This is of particular advantage because the same sequence may have to be repeated many times before a sequence of the desired quality is obtained.

Although the invention has been particularly described with a projector counterbalancing the camera, the stand may be used with the camera alone, suitable weights counterbalancing the camera about the second axis 8.

Figure 7:
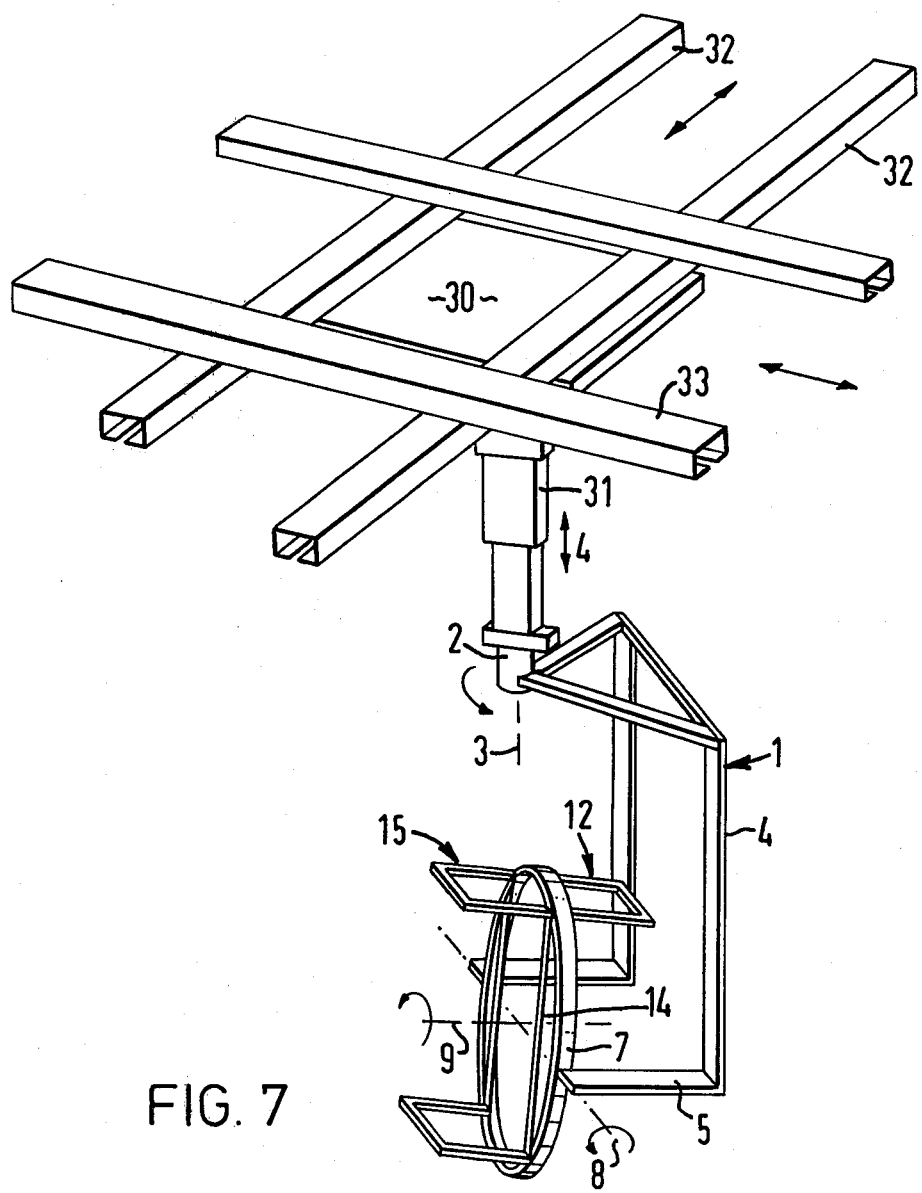
FIG. 7 is a perspective view of a preferred mounting arrangement.

FIG. 7 shows a preferred mounting arrangement where the support or stand 1 for the camera and projector is mounted up-side down as compared to the previous figures except that the circular support 7 and the respective mounting 12 and 14 for the camera and projector are retained in the position shown in FIG. 1. The support 1 is secured to a movable carriage 30 by means of a three-section telescopic boom 31 which allos the apparatus to be raised and lowered according to arrow A. The carriage 30 is supported for movement along parallel tracks 32 which in turn are mounted for movement in perpendicular direction along parallel tracks 33.

With this arrangement it is possible to obtain actual rather apparent movement in depth of a subject so that, instead of employing synchonised zoom lenses on the camera and projector, lenses with a fixed focal length can be used, the camera and projector by virtue of their common support having synchonised tracking; the focus and lighting is adjusted as before. Thus, with this arrangement it is possible to position the camera and projector almost anywhere relative to the subject and move it anywhere during filming.

I claim:

1. A stand for photographic apparatus including means for supporting the photographic apparatus for movement about three transverse axes, said axes intersecting one another substantially at a common point, said supporting means comprising, a main frame rotatable about a first axis and including spaced arms, a circular support mounted in bearings between said spaced arms of said main frame for rotation about a second axis, a rotatable portion of said circular support rotatable relative to its mounting about a third axis, said first axis containing the center of a circle, said second axis being diametric and containing the center of the circle and said third axis being through the center of the circle, a camera mounting means secured to one side of the rotatable portion of said circular support, projector mounting means secured to the other side of the rotatable portion of said circular support, and reflective means arranged to direct a projected image along the lens axis of a camera carried by said camera mounting means.

2. A stand for photographic apparatus according to claim 1 wherein said circular support includes an inner ring and an outer ring, said inner ring of said circular support being rotatable relative to said outer ring.

3. A stand for photographic apparatus according to claim 1 including two perpendicular pairs of parallel tracks arranged to be positioned in a horizontal plane above ground level, one pair of tracks being movable along the other pair of tracks, and a movable carriage supported for movement along said other pair of tracks, said main frame being suspended from the movable carriage.

4. A stand for photographic apparatus according to claim 3 wherein said main frame is suspended from the movable carriage by a telescopic boom.

5. A stand for photographic apparatus according to claim 1 wherein said camera mounting means includes two perpendicular pairs of parallel rails for adjustment of a camera carried by said camera mounting means.

6. A stand for photographic apparatus according to claim 1 wherein a semi-silvered mirror, set at about 45°, is arranged to direct a projected image directly along the lens axis of a camera carried by said camera mounting means.

7. Photographic apparatus comprising a main frame rotatable about a first vertical axis and having two spaced arms, a circular support journalled between the two spaced arms for rotation about a second diametric axis intersected by the first axis at the center of the circular support, the circular support including an inner ring and an outer ring, the inner ring being rotatable to the outer ring about a third axis passing through the center of the circular support, a camera mounted on one side of the circular support and directed through the opening defined by the circular support so that the lens axis lies substantially along the third axis, a projector mounted on the other side of the circular support having a projection axis perpendicular to the lens axis, and a semi-silvered mirror mounted at about 45° to both the lens axis and the projection axis, the projector and camera being disposed on opposite sides of vertical plane containing the second axis and the circular support so as to counterbalance each other about said second axis.

8. Photographic apparatus according to claim 7 wherein the camera and projector include zoom lenses which are electrically or mechanically interlocked with identical focal length matching so that their focal lengths can be changed in unison.

9. A photographic system comprising a support for photographic apparatus arranged for movement about three orthogonal axes, said axes intersecting one another substantially at a common point, a camera carried by said support and having a lens axis colinear with one of said three axes, a projector carried by said support and having a projection axis substantially perpendicular to the lens axis, and, reflective means arranged to direct a projected image along the lens axis of the camera.

10. A photographic system according to claim 8 wherein said support is suspended from the carriage by a telescopic boom so that said support is movable in a direction perpendicular to said single plane.

11. A photographic system comprising a support for photographic apparatus arranged for movement about three orthogonal axes, said axes intersecting one another substantially at a common point, a camera carried by said support and having a lens axis co-linear with one of said three axes and having a projection axis substantially perpendicular to the lens axis, and reflective means arranged to direct a projected image along the lens axis of the camera, said support being mounted on a carriage arranged for movement in a single plane in two directions perpendicular to one another.

* * * * *